United States Patent [19]

Yosida

[11] 4,146,915
[45] Mar. 27, 1979

[54] SHUTTER MECHANISM FOR AN ENCLOSED ELECTRICAL SWITCHBOARD

[75] Inventor: Sizuo Yosida, Fuchu, Japan

[73] Assignee: Tokyo Shibaura Denki Kabushiki Kaisha, Kawasaki, Japan

[21] Appl. No.: 843,941

[22] Filed: Oct. 20, 1977

[30] Foreign Application Priority Data

Dec. 16, 1976 [JP] Japan .................. 51-167772[U]

[51] Int. Cl.² ............................................. H02B 1/14
[52] U.S. Cl. ................................. 361/345; 200/50 AA
[58] Field of Search ............ 361/335, 337, 339, 343, 361/345; 200/50 R, 50 AA, 50 C

[56] References Cited

U.S. PATENT DOCUMENTS

| | | | |
|---|---|---|---|
| 3,015,756 | 1/1962 | Kreekon | 317/103 |
| 3,213,222 | 10/1965 | Finley | 361/345 |
| 3,219,771 | 11/1965 | Umphrey | 200/50 AA |
| 3,920,939 | 11/1975 | Ciboldi | 361/345 |

*Primary Examiner*—Gerald P. Tolin
*Attorney, Agent, or Firm*—Stevens, Davis, Miller & Mosher

[57] ABSTRACT

An enclosed electrical switchboard, in which a circuit breaker including a movable contact is drawn out from or pushed in toward a stationary contact of a disconnecting switch, is provided with a cover for covering the stationary contact of the disconnecting switch. The cover is provided with a window facing the stationary contact, and a shutter cover is provided to close the window. A mechanism moves the shutter cover to close or clear the window in accordance with the draw out and push in movements of the circuit breaker.

3 Claims, 6 Drawing Figures

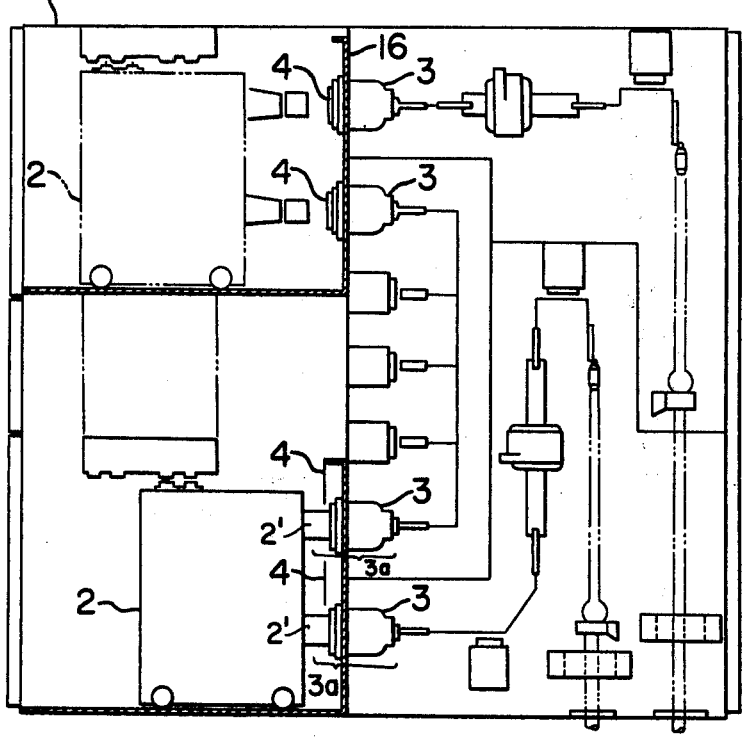
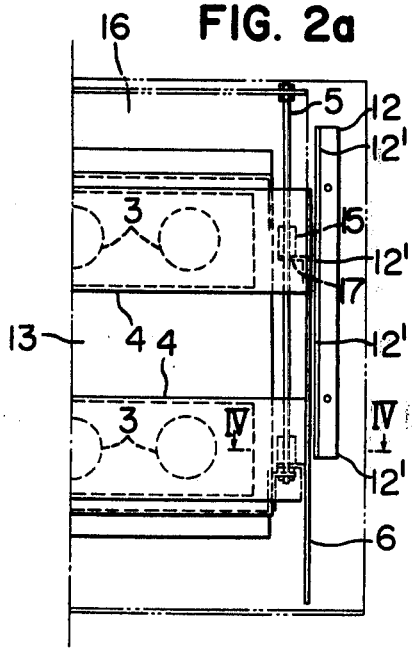
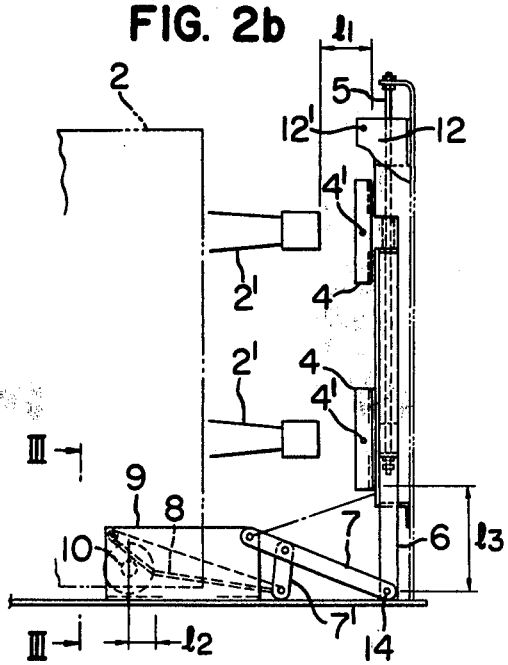

SHUTTER MECHANISM FOR AN ENCLOSED ELECTRICAL SWITCHBOARD

BACKGROUND OF THE INVENTION

This invention relates to an enclosed electrical switchboard and more particularly a shutter mechanism therefor.

Generally, in an enclosed electrical switchboard, a circuit breaker is housed in an enclosed cubicle to be movable therein, and a disconnecting switch is constructed so that it will be separated automatically from the circuit breaker when it moves. Regarding the shutter mechanism which covers the stationery contact of this disconnecting switch, JEM 1153 provides that "in F$_2$ and G type enclosed switchboard, a shutter should be provided for the opening of an automatically connecting-type disconnecting switch in a main circuit for covering the stationary contact of the disconnecting switch thus securing the safeness of persons who may approach to the opening after the drawn-out of apparatus through the opening. However, the shutter may be eliminated only in a case where substantially no space exists for a person who approaches to the opening of the disconnecting switch and where a live portion is located in the enclosed switchboard at a portion sufficiently remote from a partition wall not touchable by a person unconsciously."

However, the above provision is not applicable in almost all foreign countries and enclosed electrical switchboards for export must include a shutter mechanism. Furthermore, there are many detailed requirements for the shutter mechanism in many foreign countries. Accordingly, to accommodate the various foreign country requirements it has been necessary to provide a shutter mechanism satisfying all such provisions, because design changes in the shutter mechanism for every foreign country is extremely disadvantageous from a manufacturing standpoint as it requires changes in the construction of the circuit breaker and the enclosed switchboard frame mechanism for each country.

Foreign standards (particularly, the U.S. standard: ANSI, the British standard: BS, and, the International standard: IEC) for the shutter mechanism of an enclosed electrical switchboard are summarized as follows:

1. Thickness of plate (ANSI C37.20)

It is requested to use a steel plate having a thickness of more than 2mm and to change the thickness thereof if a plate of other metal is utilized.

2. Operation (ANSI C37.20 IEC 298)

The shutter mechanism should be constructed so that it will be closed automatically at the disconnected position, test position, and drawn-out position of the switchboard.

3. Protection at the shutter closed position (IEC 298)

The degree of protection is classified by the following symbols:
   a. IPH 2: to prevent fingers of an operator from approaching the live portion or contacting with an internal movable part.
   b. IPH 3: to prevent a wire or a tool having a thickness of more than 2.5mm from approaching the live portion or contacting with an internal movable part.
   c. IPH 6: to prevent completely a human body or other equipment from approaching the live portion or contacting with an internal movable part.

4. Locking (IEC 298,BS 162)

A shutter should be provided with means for locking the same at the shutter closed position.

5. Indication of bus bar side (BS 162)

The bus bar side of a shutter should be indicated by a name plate or painting.

6. Manual forced opening (BS 162)

After drawing-out the unit the live portion and no-voltage portion should be openable independently of each other and if the operator's hand is removed, the unit should return automatically to the original position.

SUMMARY OF THE INVENTION

Accordingly, a main object of this invention is to provide an enclosed electrical switchboard having an improved shutter mechanism.

Another object of this invention is to provide a shutter mechanism for an enclosed electrical switchboard which satisfies not only the JEM standard, but also various foregin standards (Items 1 through 6 mentioned above).

According to the present invention, there is provided an enclosed electrical switchboard of the type in which a circuit breaker is housed movably in a closed cubicle and when the circuit breaker is moved a movable contact of a disconnecting switch contacts with or separates from the stationary contact of the disconnecting switch contact mounted on a frame in said cubicle. The improvement in the described enclosed electrical switchboard comprises a cover which covers a frame in the cubicle supporting the stationary contacts of the disconnecting switch and is provided with a window at a portion facing the stationary contacts of the disconnecting switch, a pair of guide rods disposed vertically along both sides of the stationary contacts, a shutter cover having an area larger than that of the window, guide means for slidably guiding the shutter cover along the guide rods, a lever connected with the guide means and vertically movably along the guide rod in a manner which causes the shutter cover shut the window at the lowermost position of the lever, and a driving mechanism connected with the lever and arranged such that the lever lifts the shutter cover in accordance with movement of a driving member provided for the circuit breaker when the circuit breaker approaches towards the stationary contact of the disconnecting switch.

BRIEF DESCRIPTION OF THE DRAWINGS

These and other objects and advantages of the present invention will be more readily understood from the following detailed description of a preferred embodiment thereof taken in conjunction with the accompanying drawings, in which:

FIG. 1 shows a vertical sectional view of an embodiment of the enclosed electrical switchboard embodying the present invention;

FIG. 2a is a front view of a shutter mechanism embodying this invention;

FIG. 2b is a side view of the shutter mechanism;

FIG. 4 is a sectional view taken along the line IV—IV of FIG. 2a; and

DETAILED DESCRIPTION OF THE PREFERRED EMBODIMENT

Figure 3:
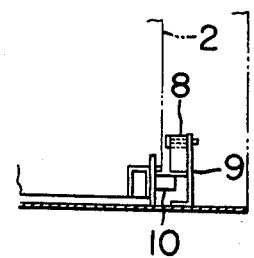
FIG. 3 is a view taken along the line III—III of FIG. 2b.

Referring to FIG. 1, an enclosed electrical switchboard comprises a closed cubicle 1, upper and lower circuit breakers 2, disconnecting switches 3a each of which comprises a movable male contact 2' and a stationary female contact 3 and shutter covers 4. In FIG. 1, the upper circuit breaker 2 is shown in its disconnecting position and the associated shutter in its closed condition, whereas the lower circuit breaker 2 is shown in its closed position and the associated shutter in its opened condition.

The shutter mechanism will now be described in detail in conjunction with FIGS. 2a, 2b, 3 and 4.

A pair of guide rods 5 are disposed on both sides of the disconnecting switches 3. Vertically movable levers 6 are provided which are operated by link mechanisms including links 7, 7' to be movable along guide rods 5. Each link mechanism is operated by a guide plate 8 in engagement with a driving member 10 provided on each side of the circuit breaker 2, and the link 7 and the guide plate 8 are pivotally mounted on a supporting plate 9 having its lower side secured to the cubicle 1. Along one side of each shutter cover 4 there is provided a locking plate 12 and both can be locked together by a lock 11. A cover 13 is provided to cover the stationary contacts 3 of the disconnecting switches 3a. The detail of the construction of each element mentioned above will be clarified through the following descriptions.

Figure 4:
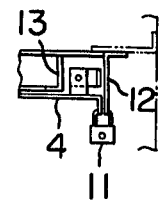

The two ends of each shutter cover 4 are bent, as shown in FIG. 4, substantially at right angles, and the bent ends are provided with holes 4', as shown in FIG. 2b, to lock the locking plate 12 and the cover 4 at the opened or closed position of the shutter. Bosses 15 which are slidably engageable with the guide rods 5 are welded to the cover 4 so as to slide the cover vertically. Each guide rod 5 is provided with threaded ends, the upper end of which is attached to a vertical frame 16 for supporting the stationary contacts 3 of the disconnecting switches 3a and the lower end of the guide rod is fixed to the cover 13 by means of a double nut. In this embodiment, the movable contacts of the disconnecting switches are constituted by contacts 2' mounted on the circuit breakers 2. Each guide rod 5 passes through the boss 15 attached to the shutter cover 4 and two L-shaped supporting flanges 17 are secured at vertically spaced points to the vertically movable lever 6 which is formed as a flat plate. Each supporting flange 17 is provided with a hole through which the guide rod 5 passes and the flange 17 supports the boss 15 fixed to the shutter cover 4 so as to allow for the separation of the boss from the flange and the upward movement of the boss and its associated cover 4.

Figure 5:
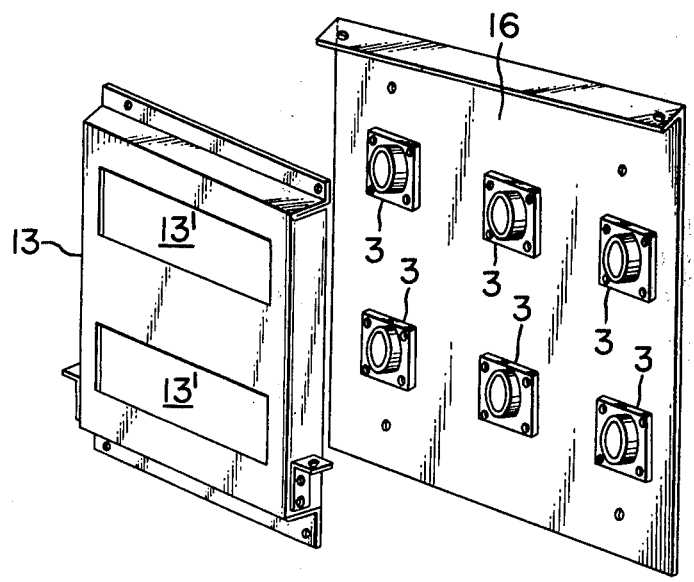
FIG. 5 is a perspective view of a shutter cover to be used for the present invention.

The link 7 is pivotally coupled at one end to the lower end of the lever 6 by a pin 14 and at the other end to the supporting plate 9 fixed to the side of the cubicle 1. The guide plate 8 is bent substantially in a doglegged shape and to this bent portion a triangular plate is welded to reinforce the same, and one end of this guide plate 8 is pivotally connected by a pin with the supporting plate 9 and the other end is also pivotally connected through the link 7' with the intermediate portion of the link 7 near the pivot point. The supporting plate 9 is bent in a L-shape and provided with two holes at its both ends for inserting the pins to pivotally support the guide plate 8 and the link 7. As a driving member 10 for the circuit breaker 2 there is utilized a pin of the wheel of the circuit breaker 2 as shown in FIG. 3. The locking plates 12 are located on both sides of the shutter cover 4 and provided with holes 12', as shown in FIGS. 2a and 2b, to lock the shutter cover 4 and the plate 12 by means of a lock 11. The cover 13 is disposed so as to cover the frame 16, in other words, the supporting plate on which the stationary contacts 3 of the disconnecting switches 3a project, as shown in FIG. 5. On the surface of the cover 13 there are formed windows 13' which face the projected stationary contacts of the disconnecting switches.

The enclosed switchboard according to this invention operates as follows.

FIGS. 2a and 2b show the closed position of the shutter covers 4 in which the circuit breakers 2 are separated from the disconnecting switches 3a, and when the circuit breakers 2 are moved forwardly from this position, i.e., rightwardly as viewed in FIG. 2b, the steeply inclined portion of the dogleg shaped guide plate 8 contacts with the driving member 10 and when the driving members 10 are moved by a stroke $l_2$, the plates 8 are rotated about the pivoted ends of the supporting plates 9. This rotary movement of the guide plates 8 is transmitted to the levers 6 through the link mechanisms 7, 7' and the levers 6 are forced upwardly by a stroke $l_3$ which is sufficient to open the shutter covers 4. The distance $l_1$ between the movable contact 2' mounted on the circuit breakers 2 and the shutter covers 4 is determined to be larger than the stroke $l_2$, so that the movable contact 2' fit in the stationary contacts 3 of the disconnecting switches 3a without colliding with the shutter covers 4. When the driving members 10 fixed to both sides of the circuit breakers 2 are advanced by the stroke $l_2$, the slightly inclined portions of the dogleg shaped guide plates 8 are also rotated to the horizontal position thereby maintaining the shutter covers 4 at their open positions. Conversely, when the circuit breakers 2 are drawn out, an operation reverse to that described above will be performed, and when the movable contacts 2' mounted on the circuit breakers 2 are separated completely from the windows 13' of the cover 13, the guide plates 8 are lowered in accordance with the return movement of the driving members 10 attached to the circuit breakers 2, whereby the shutter covers 4 begin to close. This closing operation can be performed by the weight of the shutter covers themselves and the like without the necessity of applying an external force, for example, a spring force.

According to the present invention, the foregoing Items 1 through 6 of the foreign standards can be satisfied with the following characteristics 1' through 6', respectively.

1'. Each shutter cover 4 is made of a steel plate having a thickness of 2.3mm and the movable contacts 2' mounted on the circuit breakers 2 are insulated electrically.

2'. The shutter covers 4 can be closed automatically and safely when the circuit breakers 2 are in the disconnected position.

3'. Regarding the protection at the shutter closed position, the stationary contacts 3 of the disconnecting switches 3a are entirely covered by the cover 13 as shown in FIG. 5, and the windows 13' of the cover 13 are further covered by the shutter covers 4.

4'. Concerning the locking of the shutter, as shown in FIG. 4, there is provided a lock 11 which performs the locking of the shutter cover 4 and the locking plate 12 at the shutter closed position. Furthermore, there is provided a locking hole 12' on the locking plate 12 for also holding the shutter cover 4 at its opened position so that the cleaning of the disconnecting switches 3 can be conveniently performed when the shutter is in its opened condition.

5'. It is apparent that attachment of letters N and P or painting for the indication of the bus bar side can easily be made, although a detailed explanation thereof is not made in this specification.

6'. Regarding the manual opening operation, since the supporting flanges 17 attached to the vertically movable levers 6 and the upper and lower shutter covers 4 are constructed to be separable from each other, an operator can move upwardly the desired one of the shutter covers 4 independently of the link mechanism 7, 7' and the shutter can return to its original position when the operator releases his hand.

As is understood clearly from the above, the shutter mechanism of this invention satisfies not only JEM standard but also foreign standards (in U.S.A., Great Britain, Europe) and it is very convenient and advantageous to standardize an enclosed switchboard because it is not necessary to modify the shutter mechanism to satisfy various foreign standards once the circuit breaker, a frame mechanism, etc. are designed.

Furthermore, according to this invention, due consideration is paid to facilitating the assembly of the enclosed electrical switch-board, and the improvement in assemblying the enclosed switch-board is achieved advantageously by constructing one unit including the disconnecting switches 3a, the shutter cover 4, the guide rods 5 and the movable levers 6, and another unit including the link mechanisms 7, 7' and the guide plates 8 attached to the supporting plates 9 and the frame 16, with both units being joined with each other by means of pins.

Further it is to be understood by those skilled in the art that foregoing description refers to a preferred embodiment of this invention and that various modifications and changes may be made without departing from the scope and spirit of the invention as defined in the appended claims.

I claim:

1. In an enclosed electrical switchboard of the type in which a circuit breaker is housed movably in a closed cubicle such that when the circuit breaker is moved, a movable contact of a disconnecting switch mounted on said circuit breaker in said cubicle contacts with or separates from a stationary contact of the disconnecting switch, the improvement which comprises a cover which covers a frame in said cubicle on which said stationary contact is mounted and also covers said stationary contact, said cover being provided with a window at a portion facing said stationary contact; a pair of guide rods disposed vertically along both sides of said stationary contact; a shutter cover having an area larger than that of said window; a shutter cover guide means including vertically movable levers, flanges respectively attached to said levers and fitted to said guide rods, and bosses secured to said shutter cover and respectively slidably engaged with said guide rods at a position above said flanges such that said shutter cover may independently slide along said guide rods yet be lifted by the lifting of said flanges by said vertically movable levers; and, a driving mechanism connected with said vertically movable levers, said driving mechanism cooperating with a driving member provided on said circuit breaker to move said levers to lift said shutter cover when said circuit breaker approaches towards said stationary contact.

2. The enclosed electrical switchboard according to claim 1, wherein said shutter cover is provided with a hole and said switchboard further comprises a locking plate provided for said shutter cover, said locking plate having a hole to lock said shutter cover by means of locking means which engages said hole of said locking plate and the hole provided in said shutter cover.

3. The enclosed electrical switchboard according to claim 1, wherein said driving mechanism comprises a pair of supporting plates each having one end fixed to said frame, a pair of link mechanism each having one end pivotally connected to a respective supporting plate and the other end connected to a respective vertically movable lever, and a pair of dogleg shaped guide plates each pivoted at its one end to a respective supporting plate and at the other end to a respective link mechanism, whereby said shutter cover is lifted away from said stationary contact when said movable contact mounted on the circuit breaker is moved towards said stationary contact, said driving member being moved by said circuit breaker to force upwardly the guide plates thereby forcing upwardly said vertically movable levers through said link mechanisms.

* * * * *